United States Patent [19]

Sonoda et al.

[11] Patent Number: 4,471,796

[45] Date of Patent: Sep. 18, 1984

[54] GOVERNOR VALVE FOR AUTOMATIC TRANSMISSIONS

[75] Inventors: Shiro Sonoda; Koichi Yamashito, both of Toyota, Japan

[73] Assignee: Aisin Seiki Kabushiki Kaisha, Japan

[21] Appl. No.: 443,146

[22] Filed: Nov. 19, 1982

[30] Foreign Application Priority Data

Dec. 1, 1981 [JP] Japan ................................. 56-193363

[51] Int. Cl.$^3$ ........................................... G05D 13/42
[52] U.S. Cl. ..................................... 137/56; 137/549; 210/171
[58] Field of Search ................... 137/56, 54, 544, 545, 137/549, 550; 210/168, 171

[56] References Cited

U.S. PATENT DOCUMENTS

| 2,882,915 | 4/1959 | Darnell | 137/56 X |
| 3,789,863 | 2/1974 | Enomoto | 137/54 |
| 4,194,518 | 3/1980 | Iwanaga | 137/56 |

Primary Examiner—Robert G. Nilson

Attorney, Agent, or Firm—Finnegan, Henderson, Farabow, Garrett & Dunner

[57] ABSTRACT

A governor valve for an automatic transmission comprising a valve body and a body support secured together and for rotation with an output shaft of the transmission. A line pressure passage connected to pressured fluid in the transmission and a governor pressure passage for operating the governor are formed in the body support, and passage means in the governor body connects the line pressure passage to the governor pressure passage. A normally closed valve is disposed in the passage means and normally blocks communication between the line pressure passage and the governor pressure passage, and the valve is operable to open in response to centrifugal force imparted thereto during rotation of the shaft to communicate the line pressure passage with the governor pressure passage and to actuate the governor. The passage means includes a bore in the governor valve body which is inclined relative to the axis of rotation of the shaft, and a strainer is disposed in the bore to prevent foreign matter from entering the valve.

10 Claims, 3 Drawing Figures

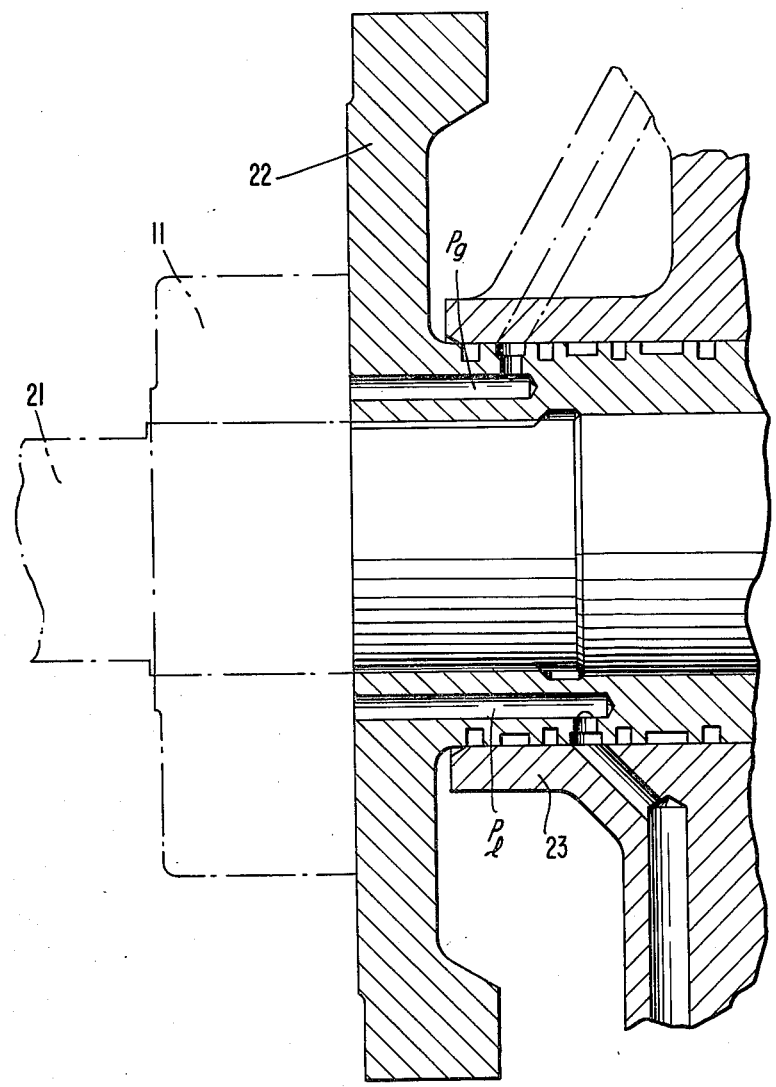

GOVERNOR VALVE FOR AUTOMATIC TRANSMISSIONS

BACKGROUND OF THE INVENTION

This invention relates to governor valves, and more particularly to a governor valve for automatic transmissions in automotive vehicles.

Automatic transmission governors which include a valve operable in response to the speed of a vehicle are known. In many of these devices, the governor valve is operable at a predetermined vehicle speed to connect transmission line pressure to a pressure operated governor. These governor valves include a valve body mounted on an output shaft of a planetary gear unit in the transmission. A filter or strainer is provided in a fluid passage or bore in the valve body to prevent foreign materials, e.g., metal chips, from entering the valve and causing it to stick.

For satisfactory operation, it is necessary that the strainer have a sufficient surface area so that it will not clog too quickly. However, in those conventional devices utilizing a tubular strainer positioned in a bore forming part of the fluid passage means in the valve body, this requires a valve body having a relatively long axial length. Since many other component parts must be located on or near this transmission shaft, it is desirable that the axial length of the governor valve body be kept as small as possible.

SUMMARY OF THE INVENTION

The present invention overcomes the problems and disadvantages of the prior art by providing a governor valve which includes a valve body mounted on and rotatable with an output shaft of a planetary gear transmission and which includes passage means connecting a line pressure passage in the transmission to a governor pressure passage. A normally closed valve in the passage means normally blocks communication between the line pressure passage and the governor pressure passage and is operable to open the response to a predetermined speed of the transmission shaft. The passage means includes a bore in the governor valve body which is inclined relative to the axis of rotation of the shaft, and a tubular strainer is positioned in the bore. By this construction, a relatively long length strainer can be employed without unduly extending the length of the valve body. Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the governor valve of this invention comprises a valve body and a body support secured together and to an output shaft of an automatic transmission for rotation therewith, a line pressure passage and a governor pressure passage in the body support, passage means in the valve body connecting the line pressure passage to the governor pressure passage, normally closed valve means in the passage means and operable to open in response to a predetermined speed of the shaft to communicate the line pressure passage with the governor pressure passage, the passage means including a bore in the valve body inclined relative to the axis of rotation of the shaft, and a strainer in the bore.

The accompanying drawings, which are incorporated in and constitute a part of this specification, illustrate one embodiment of the invention, and, together with the description, serve to explain the principles of the invention.

BRIEF DESCRIPTION OF THE DRAWINGS

FIG. 3 is a sectional view of the structure of FIG. 2 taken along the line III—III thereof.

DESCRIPTION OF THE PREFERRED EMBODIMENT

Reference will now be made in detail to the present preferred embodiment of the invention, an example of which is illustrated in the accompanying drawings.

Figure 1:
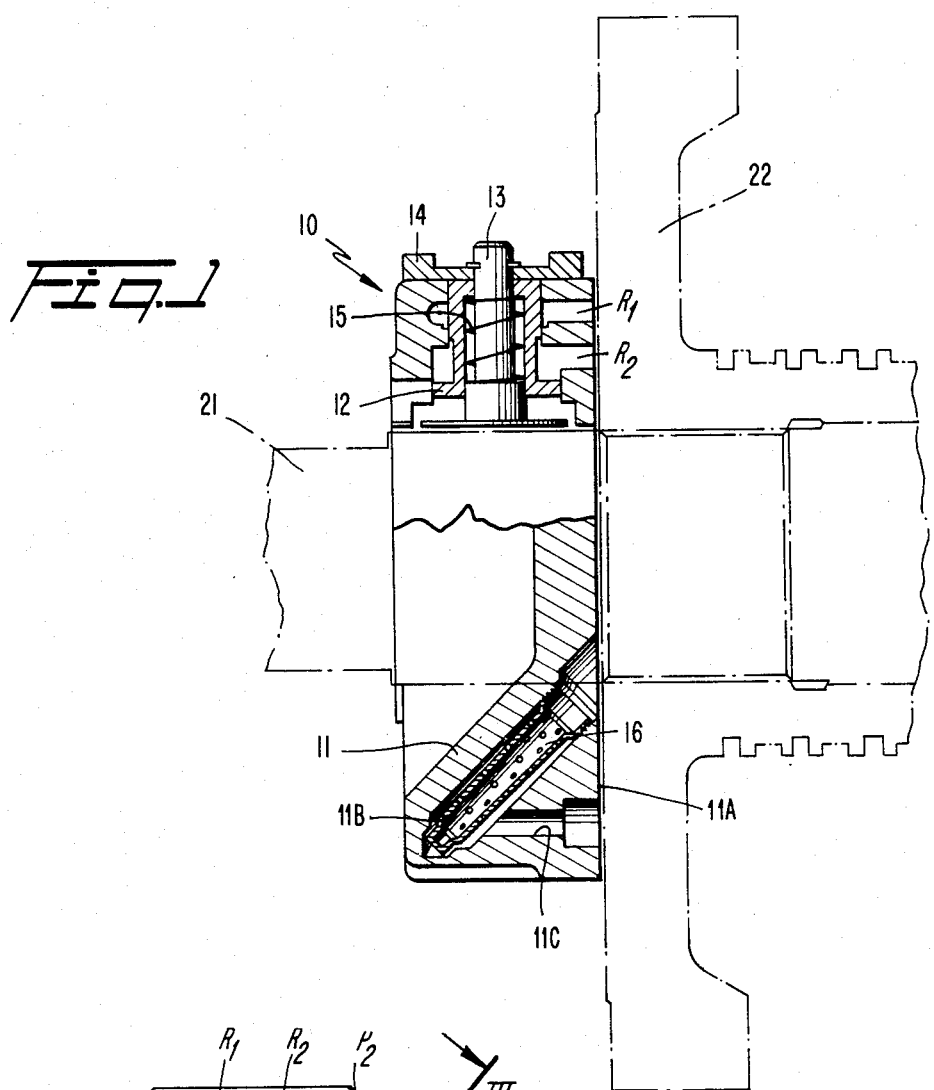
FIG. 1 is a view partly in section showing a governor valve constructed according to the present invention.

The preferred embodiment of governor valve is shown in FIG. 1 and is represented generally by the numeral 10. In accordance with the invention and as embodied herein, this governor valve includes a valve body 11 and a body support 22 which are suitably secured together and to an output shaft 21 of a planetary gear unit (not shown) forming part of an automatic transmission. The valve body 11 and the body support 22 rotate with the shaft 21 and are provided with confronting and engaged radial faces, the radial face of the valve body 11 being shown at 11a in FIG. 1.

In accordance with the invention, a line pressure passage and a governor pressure passage are in the body support, and passage means in the valve body connects the line pressure passage to the governor pressure passage. As embodied herein, a line pressure passage $P_l$ and a governor pressure passage $P_g$ are formed in the body support 22 (see FIG. 3). The line pressure passage $P_l$ extends into a transmission case 23, and governor pressure passage $P_g$ is connected to a pressure operated governor (not shown) as will be understood by those skilled in the art. The passage means includes a passage 11b (FIG. 1) formed in the valve body 11 and connected adjacent its radial inner end to line pressure passage $P_l$. An axial passage 11c also formed in the valve body, is connected to the passage 11b near its outer radial end, and extends to the radial face 11a of the valve body. As shown, the inclined passage 11b extends nearly the entire axial length of the body 11.

As further embodied herein, the passage means includes a first fluid pressure passage $P_1$ formed in the face 11a of the body 11 and which connects the axial passage 11c to a line pressure chamber $R_1$ (see also FIG. 1). Thus, bores 11b and 11c and passage $P_1$ connect line pressure passage $P_l$ to line pressure chamber $R_1$. A second fluid pressure passage $P_2$ formed in the face 11a of valve body 11 connects a governor pressure chamber $R_2$ to the governor pressure passage $P_g$.

In accordance with the invention, a normally closed valve means is provided in the passage means and is operable to open in response to the speed of the shaft to communicate the line pressure passage with the governor pressure passage. As embodied herein, a valve means including a movable valve member 12 is carried by the governor valve body 11. The valve member 12 is mounted on a valve pin 13 and has a spring 15 disposed between itself and the pin 13. A weight 14 is mounted on the pin 13 and on the outer surface of the governor valve body 11.

The valve member 12 is normally positioned as shown in FIG. 1 where it blocks communication between line pressure chamber $R_1$ and governor pressure chamber $R_2$. However, at a predetermined rotational speed of the shaft 21, the valve member 12 is caused to move outwardly under centrifugal force from this position and allows communication between the chambers $R_1$ and $R_2$. At this time, pressurized fluid is admitted to the governor pressure passage $P_g$ and activates the governor (not shown).

Figure 2:
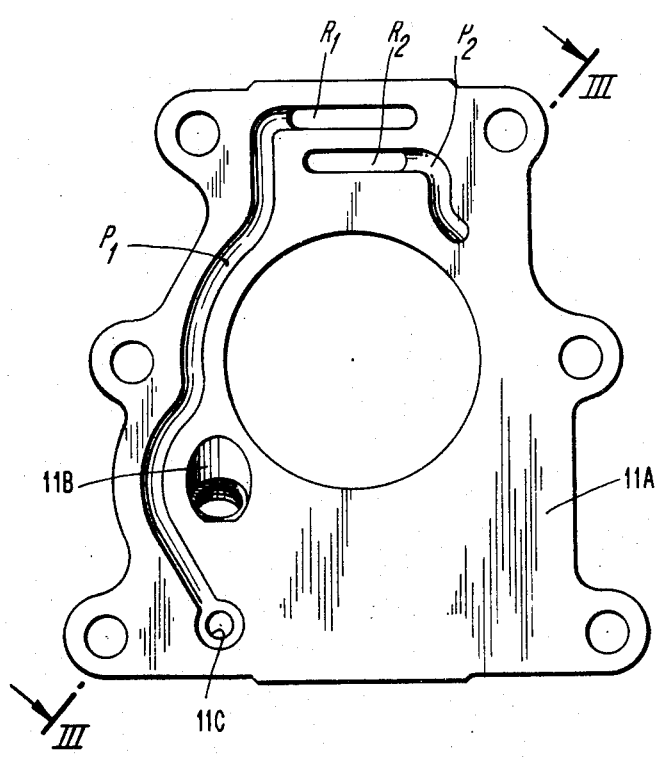
FIG. 2 is an end view of the governor valve of FIG. 1 with parts removed for clarity.

In accordance with the invention, the passage means includes a bore in the valve body which is inclined relative to the axis of rotaion of the shaft, and a strainer is positioned in the bore. As embodied herein and shown in FIG. 2, the bore 11b is inclined relative to the axis of rotation of the shaft 21. The angle of inclination of the bore 11b is approximately 45° as shown and the bore 11b extends nearly the entire axial length of the valve body 11. A tubular strainer 16 is positioned in the bore 11b and extends substantially its entire length. The strainer 16 is supported at its ends in the bore and is spaced from the wall of the bore 11b throughout the remainder of its length. Thus, a relatively long length and large surface area can be utilized without requiring that the valve body 11 have an axial dimension of corresponding length.

It will be apparent to those skilled in the art that various additions, substitutions, modifications and omissions may be made to the present invention without departing from the scope or spirit of the invention. For example, either or both of passages $P_1$ and $P_2$ can be formed in the surface of the body support 22. Also, the concept of the present invention may be applied to other kinds of governor devices apart from those associated with automatic transmissions in automotive vehicles. Thus, it is intended that the present invention cover these additions, substitutions, modifications and omissions of this invention, provided they come within the scope of the appended claims and their equivalents.

What is claimed is:

1. A governor valve for automatic transmissions comprising a valve body and a body support secured together and to an output shaft of said transmission for rotation therewith, a line pressure passage and a governor pressure passage in said body support, passage means in said valve body connecting said line pressure passage to said governor pressure passage, normally closed valve means in said passage means and operable to open in response to a predetermined speed of said shaft to communicate said line pressure passage with said governor pressure passage, said passage means including a bore in said valve body inclined relative to the axis of rotation of said shaft, and a strainer in said bore.

2. A governor valve as claimed in claim 1, wherein said bore extends over nearly the entire axial length of said valve body.

3. A governor valve as claimed in claim 1, said valve body and said support body having confronting and engaged radial faces, said passage means including passages formed in the radial face of said valve body.

4. A governor valve as claimed in claim 1, said valve body including a line pressure chamber and a governor pressure chamber connected to said line pressure passage and said governor pressure passage, respectively, said valve normally blocking communication between said line pressure chamber and said governor pressure chamber and operable under centrifugal force to allow communication therebetween.

5. A governor valve as claimed in claim 1, said bore being inclined at an angle of about 45° to the axis of rotation of said shaft.

6. A governor valve as claimed in claim 1, said line pressure passage being connected to the inner radial end of said bore.

7. A governor valve as claimed in claim 1, said strainer being tubular and extending substantially the entire length of said bore.

8. A governor valve as claimed in claim 1, said bore inclining outwardly of said valve body in a direction away from said body support.

9. A governor valve as claimed in claim 1, said valve being disposed substatially diametrically opposite said bore in said valve body.

10. A governor valve as claimed in claim 4, said valve body and body support having confronting and engaged radial faces, said line pressure passage being connected to said bore adjacent its inner radial end, said passage means including an axial passage is said valve body connected to said bore adjacent its outer radial end, and a passage formed in the radial face of said valve body connecting said axial passage to said line pressure chamber.

* * * * *